United States Patent [19]
Gilliland et al.

[11] Patent Number: 5,595,259
[45] Date of Patent: Jan. 21, 1997

[54] ROTARY GRIP WITH PADDLE FOR USE ON PALLET TRUCK

[75] Inventors: Kevin A. Gilliland, Coldwater; Larry A. Niemeyer, New Knoxville, both of Ohio

[73] Assignee: Crown Equipment Corporation, New Bremen, Ohio

[21] Appl. No.: 386,555

[22] Filed: Feb. 10, 1995

[51] Int. Cl.$^6$ ...................................................... B62D 1/14
[52] U.S. Cl. ........................... 180/332; D8/303; D8/315; 16/111 R; 74/488; 74/551.2; 74/551.9; 180/315
[58] Field of Search ..................... 180/315, 332, 180/335, 336; 273/81 B, 81 C, 81 R; D8/300, 303, 315, 313; 74/551.9, 551.2, 488, 489; 16/110 R, 111 R, DIG. 12

[56] References Cited

U.S. PATENT DOCUMENTS

| | | |
|---|---|---|
| D. 242,984 | 1/1977 | Petty . |
| D. 248,616 | 7/1978 | Johnson . |
| D. 343,935 | 2/1994 | Drobeck et al. . |
| 3,465,841 | 10/1967 | Pulskamp . |
| 3,645,151 | 11/1970 | Yoshikawa . |
| 3,834,249 | 9/1974 | Bothwell .................................. 74/551.9 |
| 4,875,386 | 10/1989 | Dickerson ................................... 74/488 |
| 4,895,044 | 1/1990 | Elkins . |
| 5,245,144 | 9/1993 | Stammen . |

FOREIGN PATENT DOCUMENTS

| | | |
|---|---|---|
| 1046146 | 12/1951 | France . |
| 291089 | 9/1953 | Switzerland . |

OTHER PUBLICATIONS

Loc (Advertisement in French).

*Primary Examiner*—Eric D. Culbreth
*Attorney, Agent, or Firm*—Biebel & French

[57] ABSTRACT

A center controlled pallet truck includes a power unit located at a forward end of the truck, an operator platform in a central portion of the truck, load carrying forks located at a rear end of the truck, a steering arm mounted on and extending upwardly from a forward section of the power unit for controlling the direction of travel of the truck. A control handle mounted on said steering arm includes twist grips for controlling the speed of both forward and reverse movement of the truck. Each twist grip is provided with a generally horizontally disposed, forward facing paddle located at the outer ends of the twist grips to permit the outside fingers on the hand of an operator to move the paddle either upwardly or downwardly and thus rotate the twist grip with minimum force either while the operator is walking along side or riding on the truck.

6 Claims, 6 Drawing Sheets

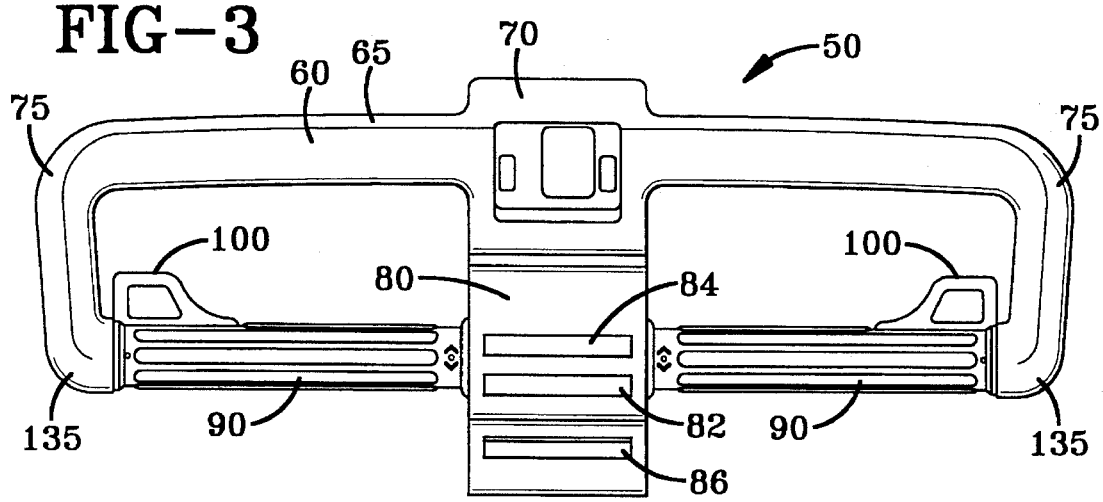
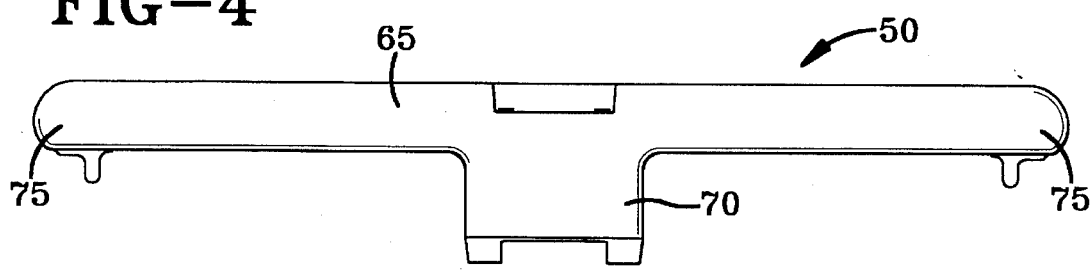
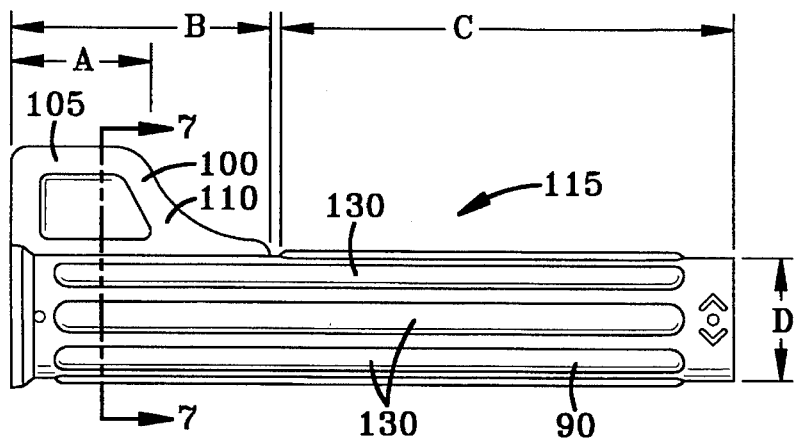
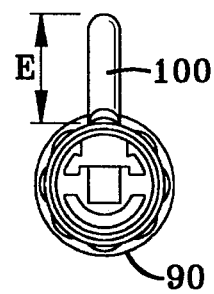
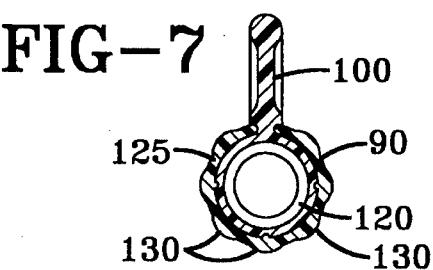

ROTARY GRIP WITH PADDLE FOR USE ON PALLET TRUCK

BACKGROUND OF THE INVENTION

This invention relates to a control handle for controlling the speed and direction of travel of pallet trucks and other related vehicles.

Specifically, this invention relates to a control handle that may be used by an operator both while riding on a pallet truck and while walking along the side the truck. Such control handles have typically included a pair of twist grips which are rotated to control the speed and direction (forward and reverse) of travel of the truck. The twist grips are intended to be rotated in the same direction as the drive wheel of the truck; thus, rotating the twist grips forward will cause the vehicle to move in the forward direction, and rotating the twist grips down or in the reverse direction will cause the truck to move in the reverse direction. Operating the twist grips in the direction opposite to the direction of rotation of the drive wheel can also accomplish a slowing or braking function, although a separate brake is available to the operator. Moving the control handle from side to side controls steering of the truck.

It is sometimes desirable to operate a truck while walking along side of it, as shown in U.S. Pat. No. 5,245,144. In this mode of operation, one of the operator's hands grips the control handle to provide positive steering control of the truck, and some mechanism is provided to control speed and direction of travel. In the U.S. Pat. No. 5,245,144, a steering control unit includes a pair of switches on either side of the control handle which are actuated to move the truck at a predetermined slow speed; vertical movement of the steering control arm controls braking of the truck.

In other trucks, the steering control arm is oriented toward the operator's platform. In this type of vehicle, the control handle will be located over the truck's power unit, not ahead of the truck and waist high. In such vehicles, control of the truck has been by use of existing twist grips, butterfly buttons on the steering arm, separate push/pull buttons and the like.

It would be desirable to provide an integrated control handle for a pallet truck which permits walk-along control while making use of the existing twist grips and without the need for separate, complex control switches or circuits.

SUMMARY OF THE INVENTION

In the present invention, a paddle (or lobe) is incorporated into a rotary or twist grip on a control handle. This feature simplifies the motion required to actuate the control and accommodates both riding and walking operation in one control.

The paddle is located to the outside of the grip for easy reach by a walking operator while at the same time allows the riding operator maximum hand spread for maximum steering leverage. The paddle is oriented and configured so the riding and walking operator can use a few fingers to push the paddle to rotate the twist grip and reduces the gripping force and rotary motion required to rotate a simple cylindrical twist grip. The paddle is made relatively thin; this permits an operator to slow the truck, when moving in the forward direction, or to move the truck in the reverse direction of travel merely by wrapping the ends of his or her outside fingers over the end of the paddle and by simply lifting the paddle.

The outer arms of the control handle are contoured at the ends thereof in a generally spherically shaped to conform to the hand of an operator; this configuration facilitates the positioning of the operator's hand so that the outside fingers of the hand naturally engage the paddle.

Since both riding and walking operation is accomplished in one device, a second set or auxiliary set of controls is not required; therefore training and use of the truck is simplified. Actuation of the twist grip can be accomplished with minimal gripping force and rotary motion.

It is therefore an object of this invention to provide a control handle which includes a pair of twist grips where each twist grip includes a generally horizontally disposed, forward facing paddle located at the outer ends thereof and which extends inwardly a sufficient distance to permit the outside fingers on the hand of an operator to move said paddle and thus rotate the twist grip with minimum force either while the operator is walking along side or riding on the truck.

It is another object of this invention to provide, in a center controlled pallet truck including a power unit located at a forward end of the truck, an operator platform in a central portion of the truck, load carrying forks located at a rear end of the truck, a steering arm mounted on and extending upwardly from the power unit for controlling the direction of travel of the truck, and a control handle mounted on said steering arm and including twist grips for controlling the speed of both forward and reverse movement of the truck, the improvement comprising said control handle including a U-shaped yoke comprising a cross member, a central housing, and a pair of arms extending rearwardly from said cross member, and a pair of twist grips, each twist grip being positioned between said housing and one of said arms, each twist grip including a generally horizontally disposed, forward facing paddle located at the outer ends thereof and extending inwardly from a corresponding arm end of the control handle a sufficient distance to permit the outside fingers on the hand of an operator to move said paddle and thus rotate the twist grip with minimum force either while the operator is walking along side or riding on the truck.

Other objects and advantages of the invention will be apparent from the following description, the accompanying drawings and the appended claims.

BRIEF DESCRIPTION OF THE DRAWINGS

FIG. 3 is a plan view of a control handle;

FIG. 4 is a front elevational view of the control handle of FIG. 3;

FIG. 5 is a plan view of a twist grip including a paddle;

FIG. 6 is an end view of the paddle of FIG. 5;

FIG. 7 is a cross-sectional view taken along line 7—7 in FIG. 5;

DESCRIPTION OF THE PREFERRED EMBODIMENT

Figure 1:
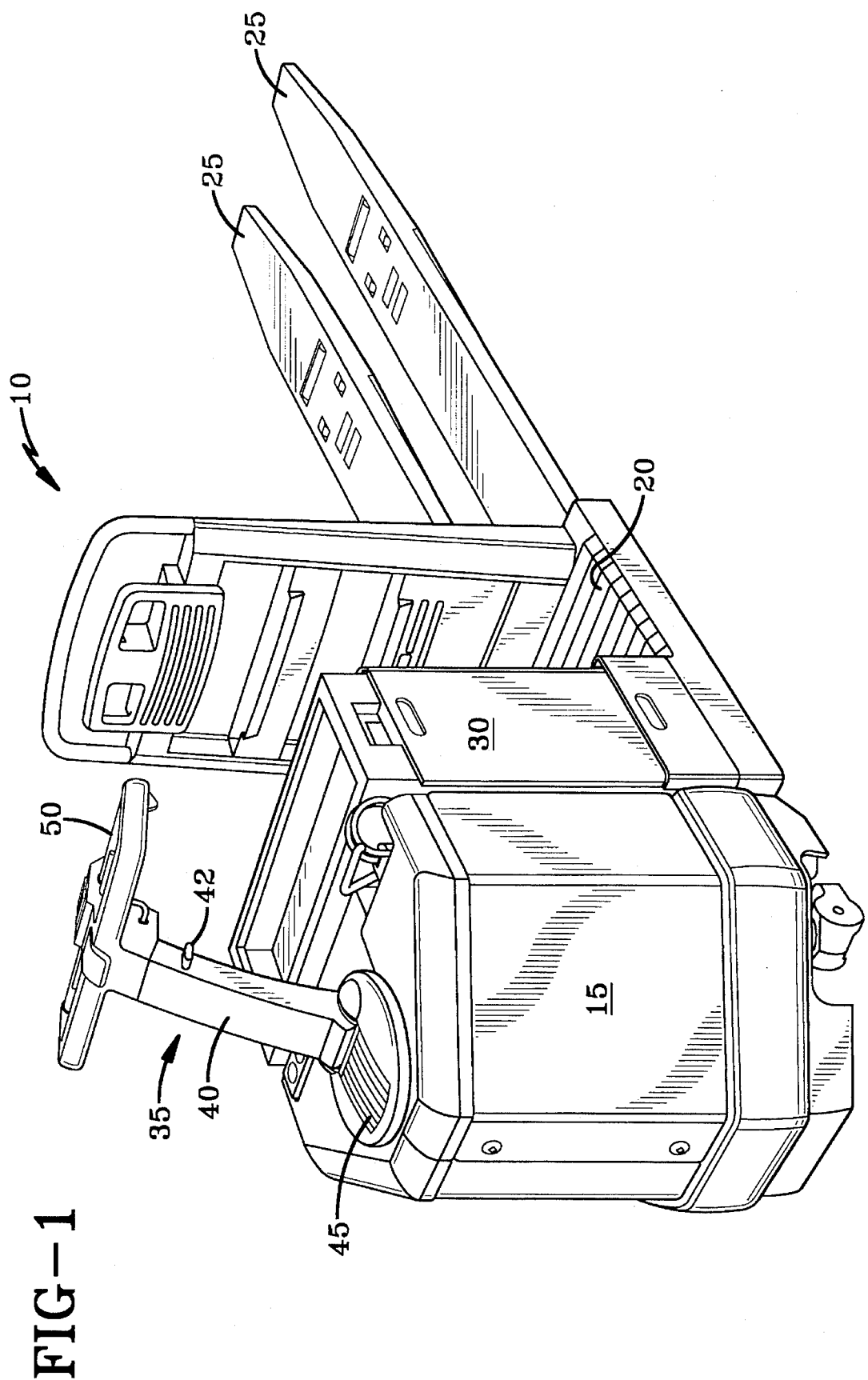
FIG. 1 is a front perspective view of a center controlled pallet truck having a control handle with twist grips incorporating the present invention.

Referring now to the drawings which illustrate a preferred embodiment of the invention, FIG. 1 shows a center control pallet truck 10 that includes a power unit 15 located at its forward part, an operator' compartment including a platform 20 in a central portion of the truck, and a pair of load carrying forks 25 at the rear of the truck. The power unit 15 includes a battery 30, a traction motor (not shown) and a T-handle steering mechanism 35 which extends upwardly and rearwardly from a forward end of the power unit.

The T-handle steering mechanism includes an arm 40, a lower end of which is attached to a steerable wheel at the forward end of the truck through a rotatable plate 45, and the upper end of which is provided with a control handle 50. The control handle is accessible to an operator either standing on the platform 20 or walking beside the truck on either side thereof.

In the truck shown in FIG. 1, the steering mechanism is pivoted to the plate 45 and may be positioned vertically to suit the preference of the operator. A lever 42 on the arm 40 is provided to accommodate the positioning of the steering mechanism, including the control handle. Side to side movement of the control handle rotates the plate 45 and thus controls the steering of the truck.

Figure 2:
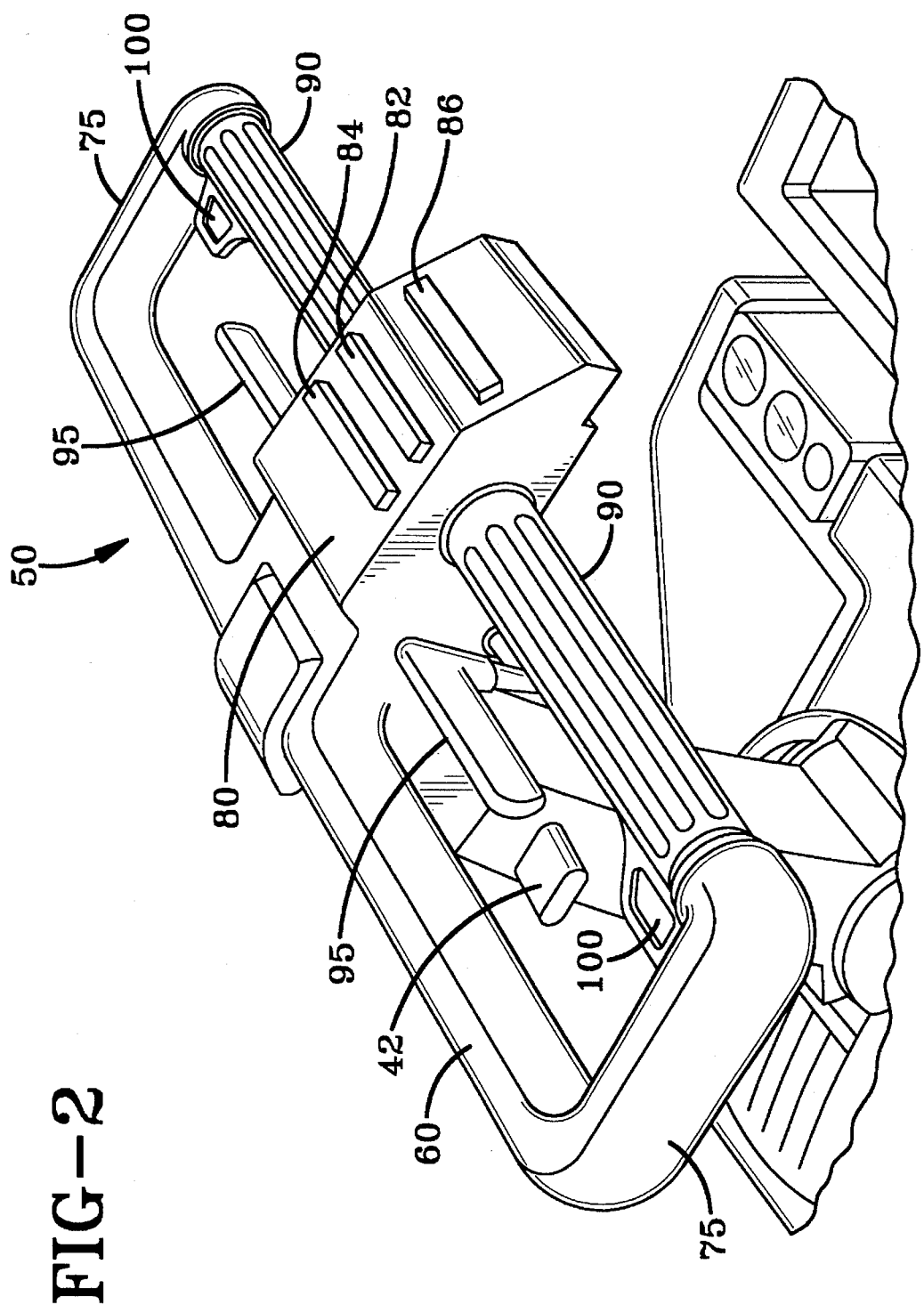
FIG. 2 is a perspective view of a control handle including twist grips constructed according to the present invention.

Turning now to FIGS. 2 through 4, the control handle 50 of the present invention includes a U-shaped yoke 60 comprising a cross member 65, a central housing 70, and a pair of arms 75 extending rearwardly from said cross member 65. The housing 70 is provided with means to attach the control handle 50 to the arm 40. A control box 80 is also centrally located of the control handle and extends rearwardly from and may be considered a part of the central housing 70. The control box supports the operation of several operator controls, such as switches 82 and 84 for controlling the raising and lowering of truck's forks, a horn switch 86, and a pair of twist grips 90.

A pair of brake levers 95 are pivotally mounted in the housing 70 and extend upwardly between the twist grips 90 and the cross member 65 where their handles are accessible to the operator's fingers while the palm of the hands rest on the grips.

The twist grips 90 are supported for rotation about a horizontal axis on their outside ends by the ends of arms 75 of the yoke 60 and on their inside ends, they are connected to a spring loaded switch assembly (not shown) within the control box 80. Both twist grips are spring biased to a center neutral position. Rotating either one of the grips will cause the traction motor to rotate the steered wheel in the same direction of rotation as the grip at a speed proportional to the amount of rotation. When the grips are released, they will return to their neutral or center position. Thus, as shown in FIG. 2, rotating the top of either twist grip 90 in the forward direction will cause the truck to move forward at a speed determined by the amount of rotation; likewise, rotating the top of either grip toward the rear of the truck will cause the truck to move in the reverse or forks first direction.

Referring now to FIGS. 2 and 5 through 7, each twist grip includes a generally horizontally disposed, forward facing paddle 100 positioned at the exterior end of the grip. As shown, the paddle 100 has a large section 105 and a tapered section 110. The paddle extends inwardly from a corresponding arm end of the control handle a sufficient distance to permit the fingers on the hand of an operator to move said paddle and thus rotate the twist grip while the operator's hand is in contact with the arm. The length A of the section 105 along the axis of rotation of each grip is approximately 1.58 inches while the total length B of the paddle is approximately 3.125 inches.

The twist grip 90 also includes a section toward the center of the control handle, shown generally at 115, which permits the operator's hand to grasp the twist grip without interference from said paddle 100 when the operator is standing on the platform. The length C of section 115 in the preferred embodiment is approximately 5.41 inches. Optionally, the operator may move his or her hand to the outside of the twist grip and use the outside fingers to manipulate the paddle. The paddle can be approximately 20% the length of the twist grip.

As shown in FIG. 7, each twist grip 90 is formed from a cylindrical tube 120 covered with a coating 125 of a soft urethane material which has formed therein a textured surface. The urethane material has a low thermal coefficient and is therefore easy to handle in both hot and cold as well as wet and dry environments. A plurality of longitudinally extending ridges 130 aid the operator in rotating the grip 90 against the spring pressure from the switch assembly in control box 80 which urges the grip toward a neutral position. The outside diameter D of the cylindrical grip 90 is approximately 1.50 inches. The paddle 100 extends from the surface a distance E, which is approximately 1.31 inches.

Figure 8:
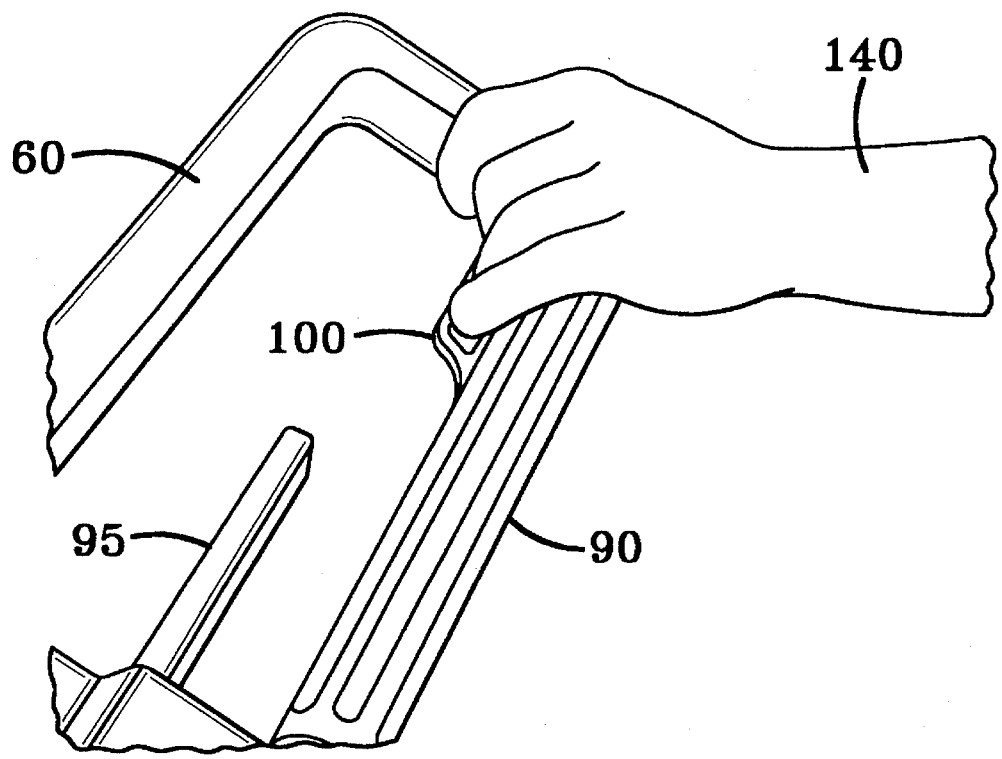
FIG. 8 is a perspective view taken from the left side of a truck showing an operator positioned on the right side of a pallet truck with the operator's left hand on the control handle and the truck moving in a forward direction.

In operation, the paddle facilitates the operator in rotating a twist grip, particularly when the operator is walking along side the truck. As shown in FIG. 8, the operator is positioned on the right side of the truck and the truck is intended to travel forward or power unit first. The left hand 140 of the operator has been placed on the rear right hand corner of the control handle with the thumb below and the index finger partially encircling the right arm 75; the other or outside fingers rest on the paddle 100. The palm of the hand rests on the spherical end of the arm 75. In this position, the operator can easily push the paddle downwardly and thereby cause the truck to move forward.

Referring to FIGS. 3 and 4, it may be seen that the outside surface of the arms 75 are curved in both the horizontal and vertical planes to fit the hand of an operator. The ends 135 of the arms 75 are generally spherically shaped. This configuration facilitates the positioning of the operator's hand so that the outside fingers of the hand naturally engage the paddle.

Figure 9:
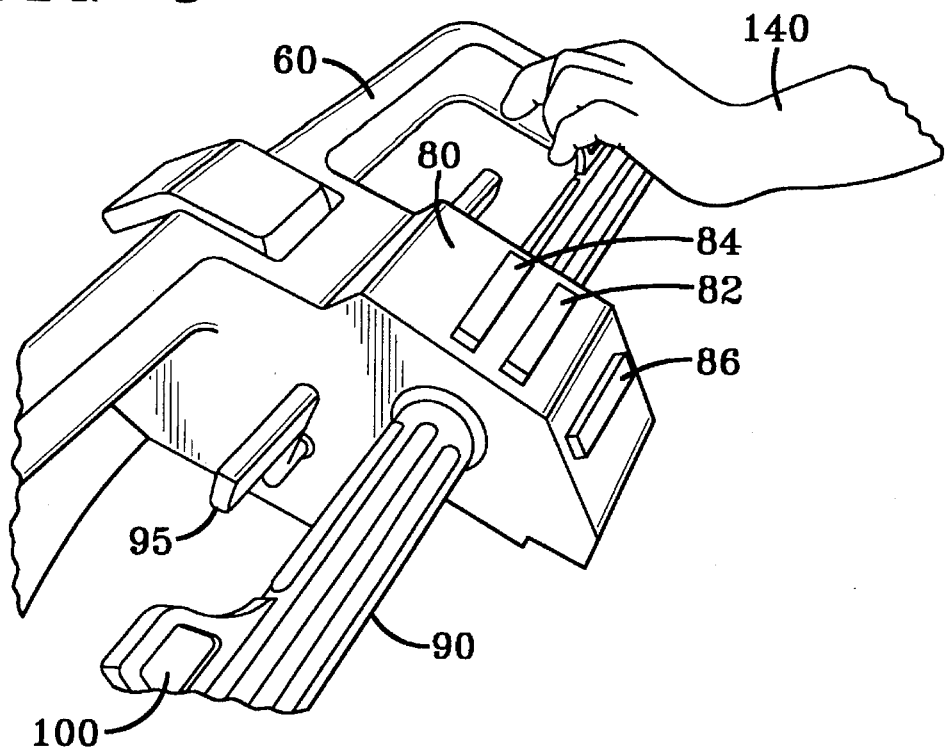
FIG. 9 is a perspective view similar to FIG. 8 showing the fingers of the operator's left hand underneath the paddle on the right hand twist grip.
Figure 10:
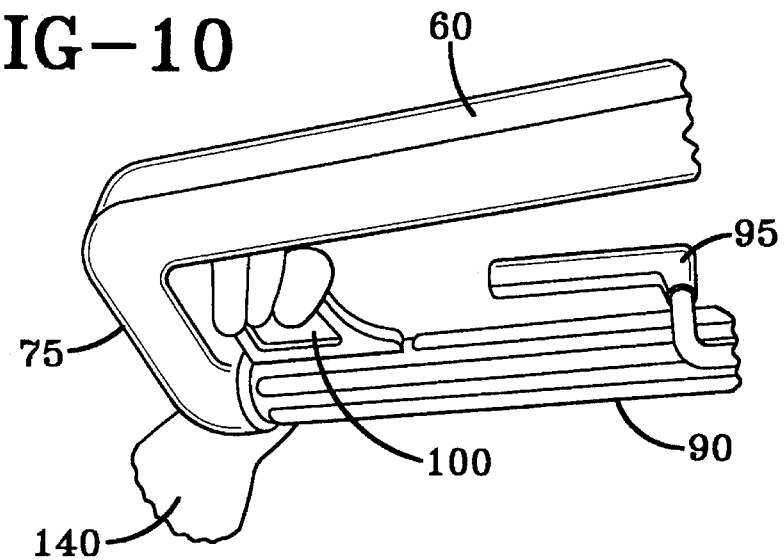
FIG. 10 corresponds to FIG. 9 and is a perspective view taken from the left front of the truck looking upward towards the operator's hand.

FIG. 9 is similar to FIG. 8 except that the operator has moved his fingers under the paddle 100 to pull it up, and thus rotate the twist grip to the rear. FIG. 10 is a view from underneath the control handle and corresponds to FIG. 9. In this mode, the operator is still facing forward, and therefore pulling up on the paddle 100 after the truck has been moving in the forward direction is intended to slow or to brake the truck to a stop using electrical plugging. Alternatively, the operator could move his hand to the left and grasp the brake lever 95.

Figure 11:
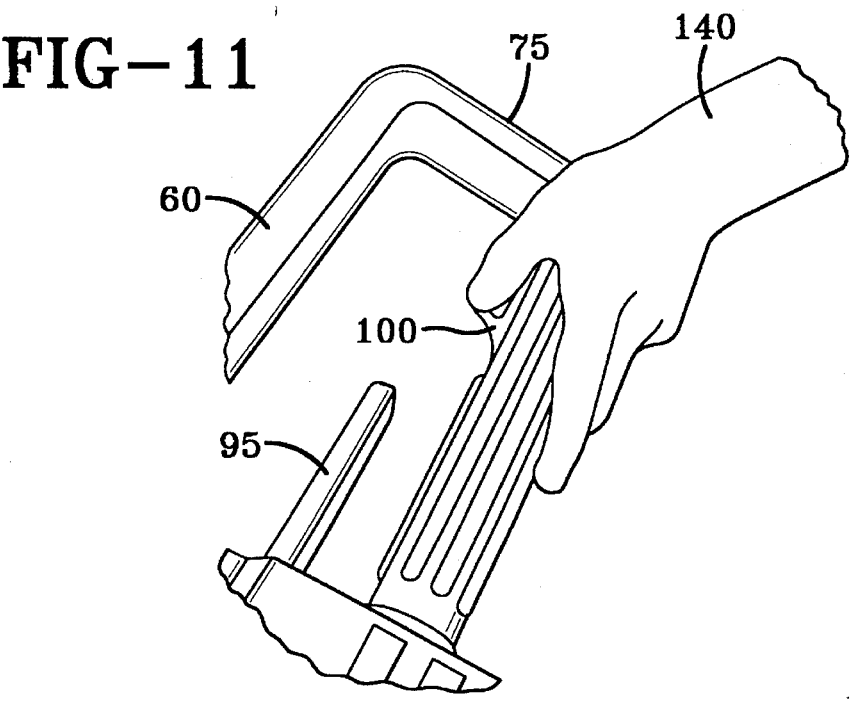
FIG. 11 is a perspective view taken from the left side of a truck showing an alternative hand grip used during forward travel of the truck.

FIG. 11 shows an alternative hand grip used during forward travel. In this mode, the operator's thumb is used to depress the paddle 100.

Figure 12:
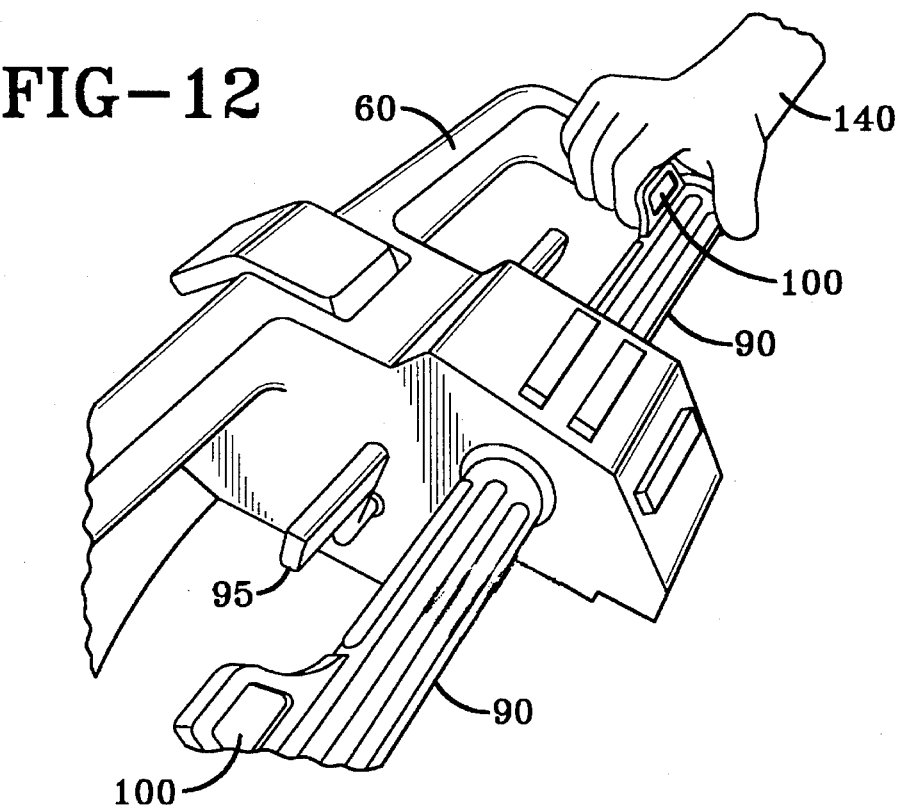
FIG. 12 is a perspective view taken from the left side of a truck showing an operator's right hand on the control handle.

FIG. 12 shows the operator positioned on the right side of the truck with the right hand on the control handle. In this mode, the truck will be moved in the reverse direction or forks first. The palm of the hand is on the top of the arm 75 and the fingers, particularly the index finger, is placed under the paddle 100 and when the paddle is lifted, the top of the grip is rotated to the rear, causing reverse travel. The hand positions shown in FIGS. 11 and 12 are not typical and would rarely be used, but they are shown to demonstrate the versatility of this invention.

With the paddle 100 placed on the outside of the twist grip 90, adjacent to the arm 75, there is ready access to the paddle by the operator under a variety of operating modes; thus, this configuration of the twist grip with the paddle placed toward the outside of the control handle makes the operation of the truck easier both while the operator walks along side of and while riding on the truck. The operator of a pallet truck will often move from one side of the truck to the other by walking through the operator's compartment during the normal course of operating the truck. The present invention facilitates the operation of the truck under these circumstances by making access to the twist grip easy from either side of the truck and from the platform 20.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A control handle for controlling the direction of travel of a center controlled pallet truck including twist grips for controlling the speed of both forward and reverse movement of the truck, said control handle including a U-shaped yoke comprising a cross member, a central housing, and a pair of arms extending rearwardly from said cross member, a pair of twist grips, each twist grip being positioned between said housing and one of said arms, each twist grip including a generally horizontally disposed, forward facing paddle located at outer ends thereof and extending inwardly a short distance from a corresponding arm end of the control handle.

2. A control handle for controlling the direction of travel of a center controlled pallet truck including twist grips for controlling the speed of both forward and reverse movement of the truck, said control handle including a U-shaped yoke comprising a cross member, a central housing, and a pair of arms extending rearwardly from said cross member, said arms having a contour at the ends thereof which is generally spherically shaped and which generally conforms to the hand of an operator, a pair of twist grips, each twist grip being positioned between said housing and one of said arms, each twist grip including a generally horizontally disposed, forward facing paddle located at outer ends thereof and extending inwardly from a corresponding arm end of the control handle a sufficient distance to permit the outside fingers on the hand of an operator to move said paddle and thus rotate the twist grip with minimum force either while the operator is walking along side of or riding on the truck.

3. In a center controlled pallet truck including a power unit located at a forward end of the truck, an operator platform in a central portion of the truck, load carrying forks located at a rear end of the truck, a steering arm mounted on and extending upwardly from the power unit for controlling the direction of travel of the truck, and a control handle mounted on said steering arm and including twist grips for controlling the speed of both forward and reverse movement of the truck, the improvement comprising said control handle including a U-shaped yoke comprising a cross member, a central housing, and a pair of arms extending rearwardly from said cross member, and a pair of twist grips, each twist grip being positioned between said housing and one of said arms, each twist grip including a generally horizontally disposed, forward facing paddle located at outer ends thereof and extending inwardly from a corresponding arm end of the control handle a sufficient distance to permit the outside fingers on the hand of an operator to move said paddle and thus rotate the twist grip with minimum force either while the operator is walking along side or riding on the truck.

4. In the pallet truck of claim 3, wherein said paddle is approximately 20% the length of said twist grip.

5. In the pallet truck of claim 3, wherein said twist grip includes a section located adjacent to said housing, which section is generally cylindrical in cross section at least the width of an operator's hand.

6. In the pallet truck of claim 3, said arms of said control handle having a contour at the ends thereof which is generally spherically shaped and which generally conforms to the hand of an operator.

* * * * *